April 18, 1967  S. MUNCK  3,315,042
ARRANGEMENT FOR THE SUPPLY OF ELECTRIC POWER
TO A RAIL TRAVELLING CARRIAGE
Filed Sept. 9, 1963  2 Sheets-Sheet 1
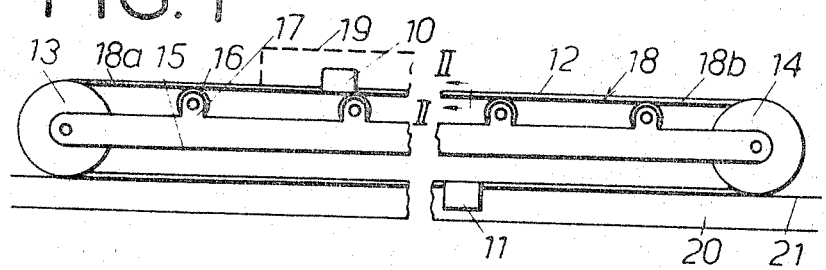
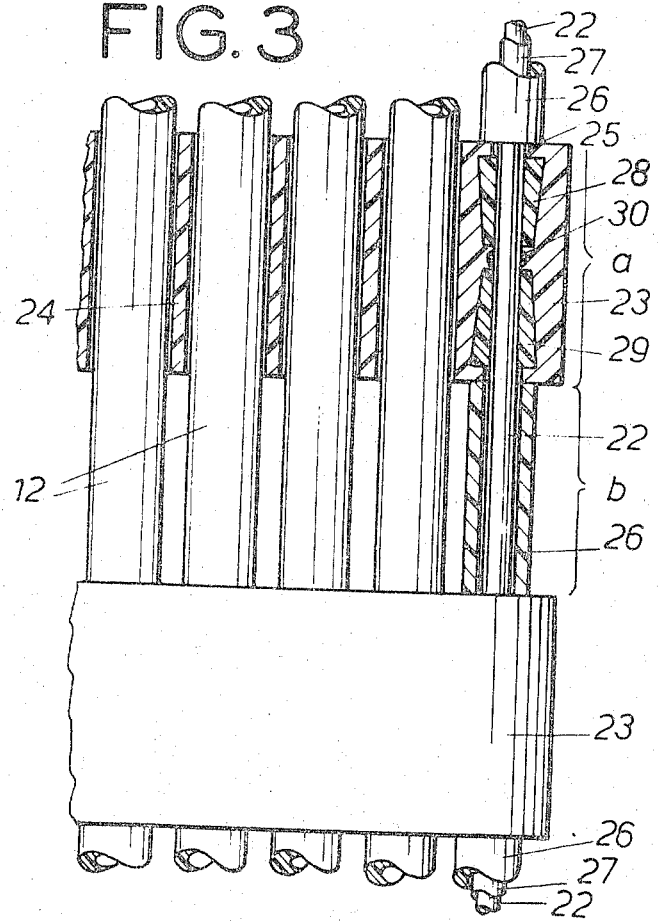
INVENTOR:
SVERRE MUNCK.
BY
McGlew and Toren
ATTORNEYS

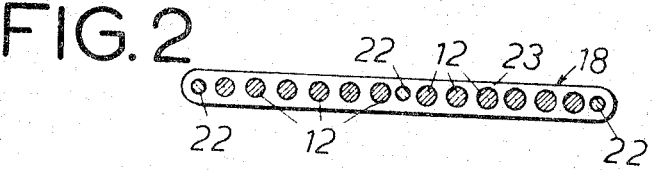
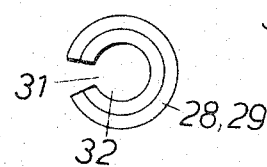
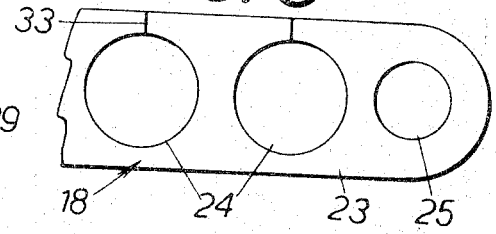
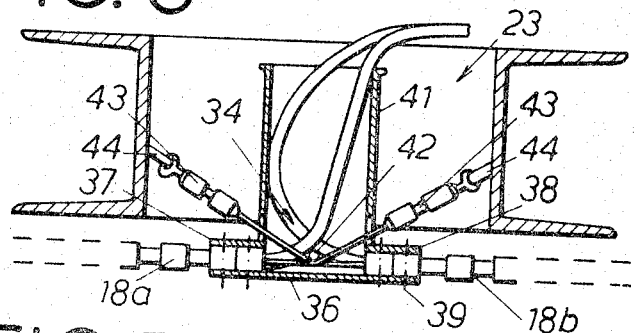
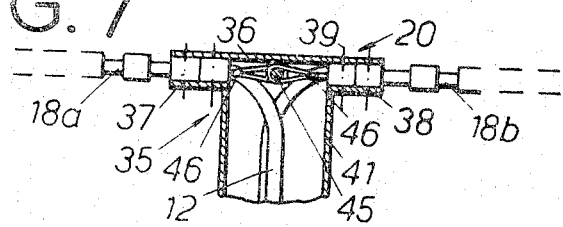
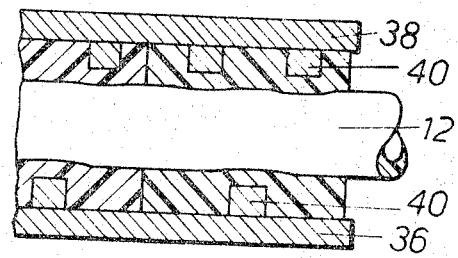
INVENTOR:
SVERRE MUNCK.

United States Patent Office 3,315,042
Patented Apr. 18, 1967

3,315,042
ARRANGEMENT FOR THE SUPPLY OF ELECTRIC POWER TO A RAIL TRAVELLING CARRIAGE
Sverre Munck, Mollendalsbakken 1, Bergen, Norway
Filed Sept. 9, 1963, Ser. No. 307,737
Claims priority, application Norway, Sept. 12, 1962, 145,677; July 6, 1963, 149,301
3 Claims. (Cl. 191—12)

The present invention relates to an arrangement for the supply of electric power to a carriage travelling on rails, of the kind comprising two sets of cables extending from a stationary supply station around a respective one of two opposed supported rolls arranged one at each end of a rigid connecting member, and to a connecting station on the carriage.

This known arrangement, which in the following will be called "an arrangement of the stated kind" is widely used for supplying electric, hydraulic or pneumatic power to travelling cranes. However, when a large number of electric cables are used, difficulties arise in connection with the proper guiding of such cables.

A main object of the present invention is to support and guide a number of electric cables in an arrangement of the stated kind, whereby such cables will be relieved of stresses tending to break the cables.

A further object of the present invention is to obtain an arrangement of the stated kind, in which stresses upon the electric cables in their longitudinal direction are substantially relieved.

According to the invention, an arrangement of the stated kind comprises a number of electric cables arranged in parallel relationship to extend in two band shaped sets around a respective one of said two opposed supporting rolls, said connecting member carrying a number of supporting idle rolls arranged on the top of said rigid connecting member and arranged to support the upper run of the cables.

In order that the invention may be understood, it will be described further by way of example with reference to the accompanying drawings, in which:

FIG. 1 is a simplified lateral view of the arrangement according to the invention.

FIG. 2 is a sectional view taken along the line II—II of FIG. 1.

FIG. 3 illustrates in a larger scale part of a plan view of the flexible cable with supports, with some parts broken away and shown in a sectional view.

FIG. 4 illustrates in a larger scale an end view of a supporting means of FIG. 3.

FIG. 5 is an end view of a modified embodiment of the supporting means according to claim 3.

FIG. 6 is a sectional view of the means for attaching the flexible cables to the rail travelling carriage.

FIG. 7 is a sectional view of the means for attaching the flexible cables to a stationary point of supply.

FIG. 8 is sectional view in a larger scale of a detail in the attaching means of FIG. 7.

In FIG. 1, a connecting box 10 is secured to a rail travelling carriage, such as a travelling crab or a trolley carriage of a crane or the like, a second connecting box 11 being secured to a stationary point of supply. Electric cables 12 extend between the connecting boxes 10, 11. When a number of electrical devices are to be controlled from a control cabin on the carriage, it may be necessary to provide separate electric cables in a substantial number between the connecting boxes 10 and 11.

It has been proposed in the prior art for preventing an undue slack in the electric cable connections to arrange the cable connections in a looped path around a roll travelling with a speed amounting to one half of the travelling speed of the carriage. This is obtained by arranging two such looped connections, each extending in a looped path around a respective one of two rolls arranged one at each end of a rigid connecting member.

FIGURE 1 depicts two flanged rolls 13, 14 arranged one at each end of a rigid connecting member 15. The member 15 consists preferably of a trussed frame (not shown). Arranged on the top of the connecting member are a number of flange-free rolls 16 supported between the rolls 13, 14 on brackets 17. All rolls 13, 14 and 16 are supported as idle rolls in bearings, not shown.

A flexible member 18 extends in the shape of two loops 18a and 18b one around each of the rolls 13, 14 from the connecting box 11 to the connecting box 10. This flexible member is band shaped and is supported by the rolls 13, 14 and also by the rolls 16. Hereby, it is possible to arrange the electric cables side by side in the lateral direction of the flexible member 18.

The carriage 19 is indicated in dotted lines on FIG. 1. When this carriage 19 moves in relation to the crane 20, the connecting member 15 will, as mentioned above, move a distance which is only one half of the distance travelled by the carriage. In such movement, the upper run of the flexible member 18 will roll upon the rolls 16, whereas the lower run of the flexible member will rest upon a base member 21 of the crane, being wound up upon or unwound from the rolls 13 and 14.

To keep the flexible member 18 stretched upon the rolls 13 and 14, this flexible member 18 is subjected to a stretching force in its longitudinal direction. This stretching force may, in a special embodiment, be in the magnitude of about 350 kilograms. However, when the flexible member 18 is flexed around the rolls 13, 14, the electric cables forming part of the member 18 are subjected to stresses in their longitudinal direction. It has appeared in practice that such flexural stresses may, in combination with the stretching forces mentioned above, lead to the copper cores of the electric cables being stretched beyond their elasticity limits. This could lead to the dangerous condition of such cores being thinned out at certain points, leaving reduced diameter portions at such points. At such portions of reduced diameter, the electrical resistance of the cables will be increased. In cables carrying a current of high amperage, such thinning-out of the copper cores may eventually lead to the cable being destroyed by undue heating at portions of reduced diameter. This is, at least at present, the most possible explanation why electric cables when used in an arrangement of the stated kind have been destroyed even after a short time in service.

The present invention has for one of its objects to extend the service life of electric cables in arrangements of the stated kind. Two different measures are used herefor. First of all, stretch receiving wires 22, preferably steel wires, are incorporated into the flexible member 18, said wires 22 being subjected to the desired tension, for instance about 350 kilograms, while leaving the electric cables 12 so to say without any other tension than the tension necessary to keep the cables fully stretched. As shown in FIG. 2, there may be arranged three such tensioned wires 22, one at each outer edge of the member 18 and one at the central line of said member. With further reference to FIG. 2 two groups each consisting of six electrical cables are arranged, each group being arranged between the central wire and a respective one of the edge wires 22.

Secondly, instead of embedding the electric cables in a continuous rubber band, the cables 12 and the wires 22 are kept together by a plurality of relatively narrow supporting members 23, preferably of rubber, said supporting members 23 extending across the member 18. In the above mentioned embodiment, the supporting members 23 may have a length or width $a$ in the longitudinal direction of the member 18 of, say 45 mm. and a spacing b between adjacent supporting members of, say 40 mm. The length of each of the loops 18a and 18b may amount to several meters, supporting members 23 being arranged along the entire length of the flexible member 18. The thickness of the supporting members is sufficient to keep the cables in side-by-side relationship in the flexible member 18.

The electric cables extend through individual bores 24 in each of the supporting members. Preferably, the bores 24 have slightly larger diameters than the cables, to prevent friction between the supporting members and the surface of the cables. The wires 22 extend through corresponding bores 25 with a slight clearance therebetween. Some of the supporting members 23 are firmly secured to the wires 22, the spacing between members so secured being for instance about one and a half meters. The remaining supporting members are kept in position by spacing sleeves 26 surrounding the wires 22. By this arrangement it is possible to relieve the tension from the electric cables, all tension being taken up by the wires 22.

When passing the rolls 13, 14, the supporting members, which are preferably made from a resilient material such as neoprene rubber, will tend to move towards the ends of the flexible member 18 because of a certain "rolling" effect created by the flexing around such rolls. This tendency of moving towards the ends is counteracted by firmly securing at least some of the supporting members to the wires while keeping the remaining ones in position by means of the spacing sleeves 26.

The wires may have a surface coating 27 of a plastic material for preventing corrosion.

As shown in FIG. 3, there are inserted from opposite ends of the bores 25, expansion sleeves 28, 29 having slightly coned outer faces. When inserting such sleeves, a solvent may be applied to the coating 27. Hereby, some of the plastic material of the coating will soften, collecting in a recess 30 between the sleeves 28, 29 to form a bond therebetween. The sleeves may also, as shown in FIG. 4, be provided with a slot 31 to enable easy mounting of the sleeve members on the wires, which are received in the central bore 32 of the sleeves.

Preferably, the sleeves 28, 29 are made of a resilient material such as neoprene rubber, to enable easy mounting around the wires and within the bores 25.

To enable easy substitution of the cables 12, the supporting members may be provided with slots 33 extending from one face of the supporting member into respective ones of the bores 24.

FIGS. 6 and 7 illustrate the means for attaching the flexible member parts 18a and 18b to the carriage 19 and to the crane 20, respectively. Such attaching means comprise a clamping plate 36 cooperating with two abutment plates 37, 38 secured to the carriage (FIG. 6) or to the crane (FIG. 7). A pair of supporting members 23 are arranged at each end of the flexible member parts 18a and 18b and clamped between the plates 36 on one side and the plates 37, 38 on the other side, for instance by means of bolts indicated by the dashdotted lines 39. As shown in FIG. 8, the plates 36-38 are provided with clamping strips 40 to secure a firm grip. Further, a tubular member 41 is secured to the plates 37, 38 to shield the electric cables 12.

In FIG. 6, the ends of the wires 22 are guided by a rod member 42, wherefrom they extend to wire stretchers 43 secured by means of eyelets 44 to the frame of the carriage. In FIG. 7, the ends of the wires 22 extend around a similar attaching rod 45 in loops kept together by wire clamps 46.

What I claim is:
1. Apparatus for electrically connecting a carriage travelling on rails to a relatively fixed supply station comprising, in combination, two sets of cables extending between said carriage and said station, each set of cables being anchored at one end relative to said carriage and, at the other end, relative to said station; a relatively elongated rigid connecting member supported for movement longitudinally of the path of travel of said carriage; a pair of supporting rolls each rotatably mounted at a respective end of said connecting member and each having a respective set of cables trained therearound; plural idler rollers rotatably mounted in longitudinally spaced relation along the upper surface of said connecting member and supporting the upper runs of said cable sets intermediate said supporting rolls; each set of cables including plural electric cables and at least one tension cable, arranged in parallel relation to form a cable band; plural supporting members extending transversely of and embracing said bands at longitudinally spaced intervals therealong, each supporting member having plural apertures therethrough and through which the cables extend, the apertures receiving the electric cables having clearance with the latter for relative movement of the supporting members and said electric cables; means anchoring said tension cables to certain supporting members separated from each other by at least one intermediate supporting member; and sleeves embracing said tension cables and extending between and abutting said supporting members to maintain the latter at positions substantially fixed longitudinally of said tension cables.

2. Apparatus as claimed in claim 1, each supporting member having slits extending transversely thereof and each aligned with an aperture receiving an electric cable, and opening between said last-named aperture and the outer surface of said supporting member; said supporting member being flexible whereby it may be bent for easy insertion of said electric cables through said slits into the associated apertures thereof.

3. Apparatus as claimed in claim 1, in which said anchoring means comprises expansion sleeves, having conical outer surfaces, inserted in the apertures of said supporting member receiving said tension cables, and tightly embracing said tension cables; each sleeve being formed with a slot extending longitudinally thereof to enable ready mounting of said sleeves on said tension cables.

References Cited by the Examiner
UNITED STATES PATENTS

| | | | |
|---|---|---|---|
| 1,866,681 | 7/1932 | Taylor | 191—12 |
| 2,395,485 | 2/1946 | Jones | 191—12 X |
| 2,435,956 | 2/1948 | Craig. | |
| 2,503,151 | 4/1950 | Ehmann | 294—74 X |
| 2,551,803 | 5/1951 | Leonard | 294—74 X |
| 2,676,376 | 4/1954 | Kellems | 294—74 X |
| 2,935,080 | 5/1960 | Klimek | 191—12 X |
| 2,975,807 | 3/1961 | Wanninger | 191—12 X |
| 3,024,325 | 3/1962 | Wanninger | 191—12 |

OTHER REFERENCES

Wanninger, German application 1,082,643, printed June 2, 1960 (KL21c), 1 page specification, 1 sheet of drawing.

Wanninger, German application 1,082,644, printed June 2, 1960 (KL21c), 1 page specification, 1 sheet of drawing.

ARTHUR L. LA POINT, *Primary Examiner.*

S. T. KRAWCZEWICZ, *Assistant Examiner.*